G. COSTA AND A. CICCONE.
STOP SIGNAL FOR AUTOMOBILES.
APPLICATION FILED JAN. 28, 1919.
1,331,002.
Patented Feb. 17, 1920.
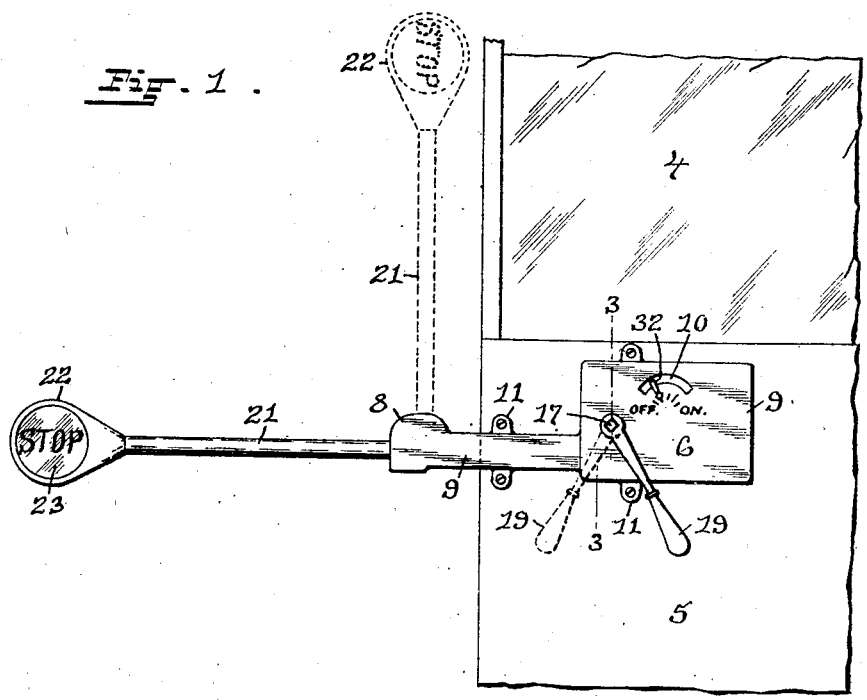
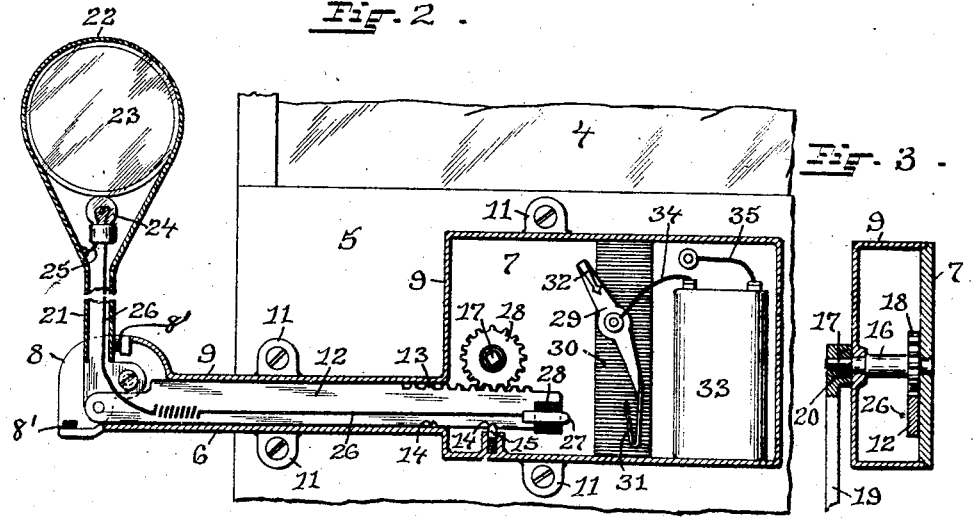
INVENTORS:
Gaetano Costa and
Angelo Ciccone
by Chas. H. Luther
ATTORNEY.

UNITED STATES PATENT OFFICE.

GAETANO COSTA AND ANGELO CICCONE, OF PROVIDENCE, RHODE ISLAND.

STOP-SIGNAL FOR AUTOMOBILES.

1,331,002.  Specification of Letters Patent.  Patented Feb. 17, 1920.

Application filed January 28, 1919. Serial No. 273,551.

*To all whom it may concern:*

Be it known that we, GAETANO COSTA, a subject of Italy, and ANGELO CICCONE, a citizen of the United States, and residents, respectively, of Providence, in the county of Providence and State of Rhode Island, have jointly invented a new and useful Improvement in Stop-Signals for Automobiles, of which the following is a specification.

In the use of automobiles, the driver when intending to stop, usually holds out his arm as a signal to following automobiles, that he is going to stop. This method of signaling is crude and tiresome for the driver, as sometimes it is necessary to hold out the arm for a considerable length of time.

The object of our invention is to improve the construction of stop signals for automobiles, whereby the signal and its operating mechanism forms a complete unit and may be secured to the instrument board of the automobile, in a convenient position for the driver.

A further object of our invention is to provide such a stop signal with a self contained operating mechanism and lighting system, so that the stop signal may readily be seen at night.

Our invention consists in the peculiar and novel construction of a stop signal for automobiles, said stop signal having details of construction, as will be more fully set forth hereinafter and claimed.

Figure 1 is a vertical view of part of the wind-shield and instrument board of an automobile provided with our improved stop signal, looking from the front seat toward the instrument board, and showing the stop signal in the down or signaling position in full lines and in the up or non-signaling position in broken lines.

Fig. 2 is an enlarged longitudinal sectional view of the stop signal, looking into the same, and Fig. 3 is a transverse sectional view through the stop signal, taken on line 3—3 of Fig. 1.

In the drawings 4 indicates part of a wind-shield and 5 part of an instrument board of an automobile provided with our improved stop signal device 6. The stop signal device 6 consists of a rectangular shaped base plate 7 having an outstanding arm 8 in the outer end of which are soft rubber buffers 8', 8' at the limit of travel of the signal arm, as shown in Fig. 2. A cover 9 is shaped to cover the base plate 7 and arm 8 and has a switch opening 10 in its front and lugs 11 11 by which the base plate and cover are secured to the instrument board 5 by screws, as shown in Fig. 2. A rack bar 12 having the teeth 13 and inverted V shaped notches 14 14 adjacent its inner end, is slidably supported in the cover 9 on the arm 8. A spring operated catch 15 is operatively supported in the cover 9 and has an inverted V shaped end in a position to engage with the notches 14 14 in the rack bar 12. A pinion shaft 16 is rotatably supported in bearings in the base plate 7 and cover 9 and has a square outer end 17 and a pinion 18 engaging with the teeth 13 on the rack bar 12, as shown in Fig. 2. An operating lever 19 has a square hole 20 by which it is detachably secured to the square end 17 of the shaft 16, as shown in Fig. 3. A tubular stop signal arm 21 is pivotally secured, off center at its inner end, to the outer end of the arm 8 and the inner end of the stop signal arm 21 is pivotally secured to the outer end of the rack bar 12. The stop signal arm 21 has an enlarged outer signal end 22 with glass sides 23 23 on one of which is the word Stop. A small incandescent electric lamp 24 is secured in the end 22. A wire 25 comes from one terminal of the lamp and is electrically connected to the metal signal end 22. An insulated wire 26 comes from the other terminal of the lamp down through the arm 21 and then along the rack bar 12 to a metal contact point 27 embedded in an insulating member 28 on the inner end of the rack bar 12. A switch 29 is pivotally secured to a strip of insulating material 30 which is secured to the base plate 7. The switch 29 has an inner spring contact end 31 in a position to engage with contact point 27, when the switch is on, and an outer indicating and operating end 32, which extends through the opening 10 in the cover, as shown in Fig. 1. A scale and the words Off and On are shown on the cover. A dry battery 33 is held in the cover 9 on the base plate 7. A wire 34 connects one pole of the battery with the switch 29 and a wire 35 connects the other pole of the battery with the metal base plate 7, thereby completing the electric circuit, when the switch is on.

Our improved stop signal device for automobiles, with its operating mechanism and lighting system, is a complete unit in itself.

When in use it is secured preferably to the left hand side of the instrument board in a convenient position for the driver. In its normal or non-signaling position the stop signal arm 21 is in a vertical position as shown in broken lines in Fig. 1, and is held in this position by the catch 15 entering a notch 14 in the rack bar 12, as shown in Fig. 2. The operating lever 19 is now in the position as shown in broken lines in Fig. 1. In the daytime the switch 29 is in the off position, as shown in Figs. 1 and 2. The stop signal arm 21 is thrown down into a horizontal stop position by moving the operating lever 19 to the right, as shown in full lines in Fig. 1. This movement of the operating lever 19 operates through the pinion 18 and rack bar 12 through its pivoted connection with the end of the stop signal arm to put the stop signal into its stop signaling position, as shown in full lines in Fig. 1. In signaling at night, the switch would be moved into the on position. The inward movement of the rack bar 12 would now bring the contact point 27 into electrical contact with the contact end 31 of the switch 29, thereby completing the electric circuit, lighting the lamp 24, and illuminating the signal end of the arm 21. A reverse movement of the operating lever 19 will raise the arm 21, break the electrical connection and put the lamp out.

It is evident that as our improved stop signal for automobiles is a complete operative unit in itself, it may, with slight change, be secured to the steering column or other convenient part of an automobile.

Having thus described our invention we claim as new:—

1. A stop signal device for automobiles comprising a base plate, an integral horizontal side arm on the base plate, a cover shaped to fit over the base plate and arm, a rack bar slidably supported on the arm, a pinion shaft in bearings in the base plate and cover, a pinion on the pinion shaft engaging with the teeth on the rack bar, a tubular stop signal arm pivotally secured to the outer end of the base plate arm and pivotally connected to the outer end of the rack bar, a stop signal on the outer end of the stop signal arm, soft rubber buffers on the end of the side arm in a position to limit the travel of the signal arm, means for operating the pinion shaft to raise and lower the stop signal, automatic means for holding the stop signal in the raised position and means for securing the base plate to the instrument board of an automobile.

2. A stop signal device for automobiles comprising a base plate 7 having an integral outstanding side arm 8 in the end of which are soft rubber buffers 8' 8', a cover 9 over the base plate and arm, a rack bar 12 slidably supported on the base plate arm, a pinion shaft 16 in bearings in the base plate and cover and having an outer end 17, a detachable operating lever 19 on the outer end of the pinion shaft, a pinion 18 on the shaft engaging with the rack bar, a tubular stop signal arm 21 pivotally secured to the outer end of the base plate arm and pivotally connected to the outer end of the rack bar, a stop signal having transparent sides on the outer end of the stop signal arm, means for holding the stop signal in a vertical position, means for holding the stop signal in a horizontal position and means for securing the device to an automobile instrument board.

In testimony whereof, we have signed our names to this specification.

GAETANO COSTA.
ANGELO CICCONE.